Oct. 4, 1938.    R. H. STONE    2,132,326
TUBE COUPLING
Filed Aug. 31, 1936
FIG. 1
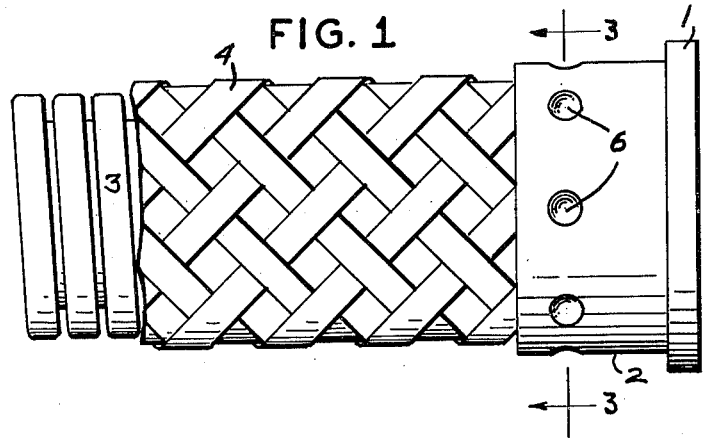
FIG. 2
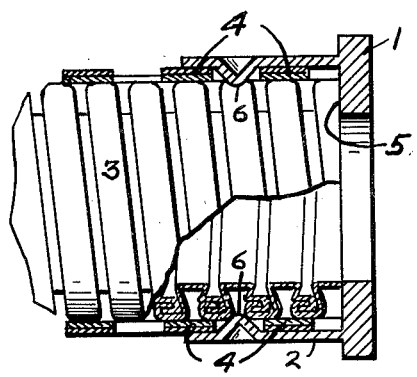
FIG. 3
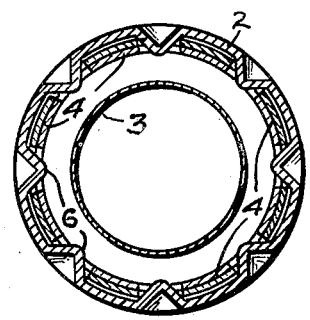
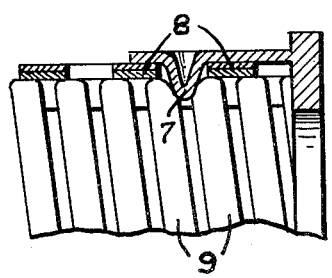
FIG. 4
R. H. Stone   INVENTOR.
BY Thomas Howe
ATTORNEY.

Patented Oct. 4, 1938

2,132,326

UNITED STATES PATENT OFFICE 2,132,326

TUBE COUPLING

R. Harry Stone, Bound Brook, N. J., assignor to Titeflex Metal Hose Co., a corporation of New Jersey Application August 31, 1936, Serial No. 98,649

4 Claims. (Cl. 285—72)

This invention relates to the securing of a hose or pipe and a coupling member together.

The main object of the invention is to provide a simple and efficient means for securing a hose or pipe to a coupling.

A further object of the invention is to provide a means of the character indicated where the mechanical fastening of the hose or pipe to the coupling shall not be impaired by heat.

A further object of the invention is to provide means, mechanically strong under heat, for securing a tube or pipe having a braided covering thereon to a coupling.

A further object of the invention is to provide means, the mechanical strength of which is unimpaired by heat, for securing to a coupling a corrugated pipe or tube.

A further object of the invention is to provide means, mechanically strong under heat, for securing to a coupling a corrugated tube having a braided covering.

Other and ancillary objects will appear hereinafter.

In the accompanying drawing which illustrates the invention—

Fig. 1 is a side elevation of a tube or hose secured to a coupling member, the invention being embodied therein and the tube being broken away;

Fig. 2 is an axial section through the apparatus of Fig. 1, the corrugated tube being shown partly in elevation;

Fig. 3 is a section on the line 3—3 of Fig. 1; and

Fig. 4 is a central longitudinal section through a tube and coupling member embodying a modified form of the invention, the tube and coupling being partly broken away and the corrugated tube being shown in elevation.

Referring to the drawing, and first to Figs. 1 to 3 inclusive, the apparatus comprises a coupling member 1 having a skirt 2 within which is received a flexible metal hose or tube comprising the corrugated tube 3 having an outer braided covering of metal strips or ribbons 4.

The coupling member, it will be observed, may be swiveled to its cooperating coupling member or fixed thereto as may be desired as is well understood in the art.

The corrugated tube 3 may be formed in any suitable or well known fashion and may be formed from a strip as described in the patent to Louis H. Brinkman, 1,198,392 patented September 12, 1916, and such tube may or may not include an outer casing or covering of braid 4 consisting of the interwoven flat metal strips as shown for instance in Fig. 5 of the patent to Louis H. Brinkman No. 1,340,818 patented May 18, 1920.

The coupling member 1 has an internal shoulder 5 against which the tube may abut and the pipe or tube, including the corrugated flexible metal hose 3 and the metal braided covering 4, may be soldered to the coupling so as to form a fluid-tight joint.

It is found, however, that when the tube is merely soldered to the coupling, in some locations the solder may become fused or weakened by heat and the tube might, under some circumstances, be pulled loose from the coupling.

To mechanically secure the tube to the coupling member so that there is no danger of separation even though the solder does fuse or become weakened, one or more depressions 6 are formed in the skirt intermediate of the ends of the coupling member. These depressed portions may be formed by driving a punch inwardly from the outside of the skirt or in any other suitable way. Also the depressed portions might be formed before assembly of the tube and coupling, the elasticity of the depressed portions and cooperating parts being such that the tube can be forced within the coupling when the depressed portions will assume their proper relationship to the tube. The projections extend inwardly in between the strands of the braid 4 (see Figs. 2 and 3) and thus form a secure mechanical connection between the coupling member and the tube structure. The depressed portions are shown as extending entirely through the braid and even slightly beyond (see Figs. 2 and 3). To support the structure while punching in the depressed portions as referred to, a mandrel may be inserted in the tube but no mandrel would ordinarily be used in assembling the coupling member and tube where the depressed portions were formed prior to such assembly.

The fixity of a depressed portion and the security with which the coupling and tube structure are held together is enhanced by the fact that the depressed portions are supported on both sides longitudinally of the tube. Especially is it desirable that the depressed portion should be supported from the side, longitudinally of the tube, which is nearest the end at which the tube enters the skirt, as otherwise the portion might bend if a considerable force were applied tending to separate the tube from the coupling, while if the depressed portion is supported from the longitudinal side towards the open end of the skirt, that is the end at which the tube enters the skirt, it will be practically impossible, with all forces likely to be applied, to separate the coupling member and the tube structure.

With the mechanically securing means as described, the solder or other substance may still be employed to make the joint fluid-tight, but if the solder should become softened and it, or any other substance employed, be ineffective for holding the parts together mechanically, the coupling and tube would still be held together and the solder or other substance would not ordinarily escape, so that it would still remain in the joint although it might become softened.

Referring to Fig. 4 of the drawing, the apparatus is the same as shown in Figs. 1 to 3 inclusive except that the depressed portions 7 are made sufficiently deep to not only extend through the braided covering 8 but also in between the corrugations 9 of the corrugated tube. This adds to the strength of the fastening between the coupling member and the tube structure.

While the invention has been illustrated in what are considered its best applications it may have other embodiments without departing from its spirit and is not therefore limited to the structures shown in the drawing.

What I claim is:

1. The combination with a coupling member having a skirt, of a corrugated tube entered within said skirt, said skirt having one or more projections intermediate the ends of the coupling member, said projections projecting inwardly of said skirt and engaging said tube to secure it to said member each of said projections being at its inner end of a length longitudinally of the tube which is less than the width of a corrugation.

2. The combination with a coupling member having a skirt, of a tube entered within said skirt, said tube having an exterior braided covering, said skirt having one or more depressed portions intermediate the ends of the coupling member, said depressed portions projecting inwardly of said skirt and between strands of braid to secure said tube to said member.

3. The combination with a coupling member having a skirt, of a corrugated tube entered within said skirt, said skirt having one or more depressed portions intermediate the ends of the coupling member, said depressed portions projecting inwardly of said skirt and extending between adjacent corrugations of the tube to secure it to said member.

4. The combination with a coupling member having a skirt, of a corrugated tube entered within said skirt, said tube having a braided covering, said skirt having one or more depressed portions intermediate the ends of the coupling member, said depressed portions projecting inwardly of said skirt and extending between the strands of the braid and between the corrugations of the tube to secure the tube to said member.

R. HARRY STONE.